No. 797,328. PATENTED AUG. 15, 1905.
A. SCHATZ.
LIFTING JACK.
APPLICATION FILED DEC. 31, 1904.
2 SHEETS—SHEET 1.
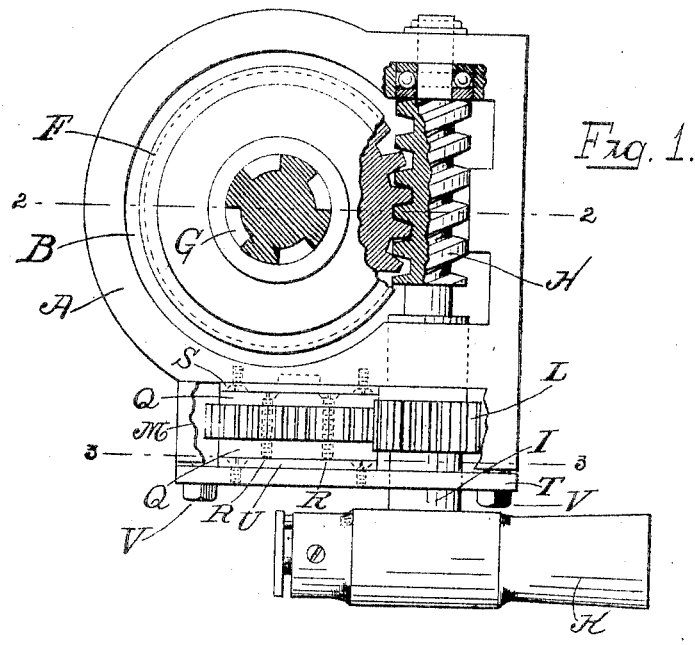
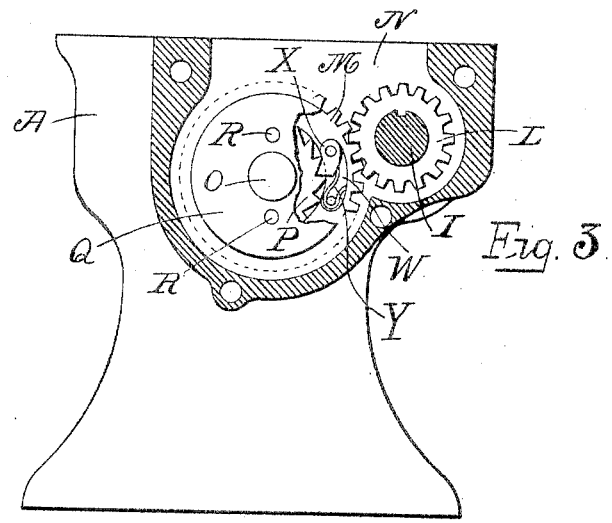
Witnesses
J. S. Coleman
M. Olive Williams
Inventor
Adolf Schatz
by Beach & Fisher
Attorneys

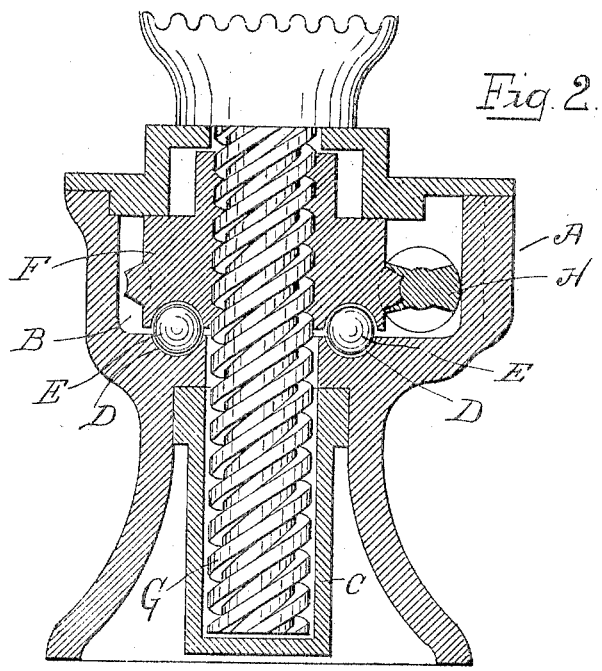
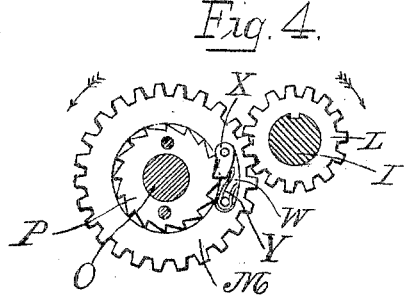
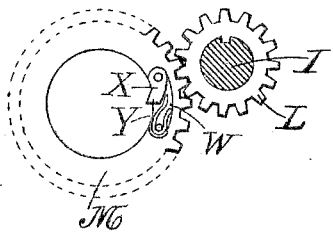

UNITED STATES PATENT OFFICE.

ADOLF SCHATZ, OF CHAPPAQUA, NEW YORK.

LIFTING-JACK.

No. 797,328.      Specification of Letters Patent.      Patented Aug. 15, 1905.

Application filed December 31, 1904. Serial No. 239,147.

*To all whom it may concern:*

Be it known that I, ADOLF SCHATZ, of the town of Chappaqua, county of Westchester, State of New York, have invented new and useful Improvements in Lifting-Jacks, of which the following is a full, clear, and exact description when taken in connection with the accompanying drawings, which form a part thereof, and in which—

Figure 1 represents a top view of a lifting-jack embodying the invention, the cap being removed and some of the parts being shown broken away; Fig. 2, a transverse vertical section on line 2 2 of Fig. 1; Fig. 3, a transverse vertical section on line 3 3 of Fig. 1; Fig. 4, a detail view of the friction device and its associated parts, and Fig. 5 a detail view of the ring-gear of the friction device.

In all figures similar letters of reference represent like parts.

This invention relates to lifting-jacks, and has for its object the production of a novel form of friction device for retarding the downward movement of the screw, except when desired by the operator. When the jack is employed in supporting an excessive weight, there is danger that the weight will force the screw to turn the worm-wheel and worm against the desire of the operator, which the friction device of the present invention will prevent, while, on the other hand, when the operator is operating the worm and wheel to lift the jack the frictional connection will be removed from the device.

To this end the invention consists of the improvements and combinations of parts set forth and claimed hereinafter.

Referring to the drawings for a more particular description, the part designated by the letter A represents the body or casing of the jack, which is provided with a hollow recess B, from which depends a hollow socket C. In the recess B around the mouth of the socket C is an annular groove D for the reception of a series of balls or roller-bearings E. Mounted on the balls E is a worm-wheel F, provided with internal screw-threading for the purpose of meshing with the thread of the lifting-screw G. On the periphery of the worm-wheel F is a thread adapted to mesh with the thread on an endless screw or worm H, horizontally disposed in the recess B and having bearings in the casing A. The worm H is rigidly mounted on or formed integral with, a shaft I, projecting laterally outward through the casing A and having mounted on its outer end a crank-arm K of any suitable construction. On the shaft I, between the crank K and worm H, is rigidly mounted or formed integral therewith a gear L, meshing with a ring-gear M, located within a recess N in the side of the casing A.

So far the parts described are substantially similar to those set forth in Letters Patent of the United States numbered 780,132 and issued to me on January 17, 1905.

Mounted on a stud O, projecting from the side of the casing A, is a ratchet-wheel P, and on both sides thereof are secured plates Q, of steel or other suitable material, by screws R or other suitable means. A plate S, of fiber or other suitable material, is shown rigidly connected to the side of the casing A within the recess N by screws or other suitable means, against which the interior plate Q is adapted to come in contact.

T designates a cap-plate adapted to close the lateral opening in the recess N and is held in place by bolts V or other suitable means. On the inside of the plate T and secured thereto by screws or other means is a plate U, of fiber or other suitable material, which is adapted to come in contact with the outer plate Q on the ratchet-wheel P. By forcing the cap-plate T, by means of the bolts V, tightly against the casing the plates S and U may be made to bear with increased friction against the plates Q on the ratchet-wheel P.

The ratchet-wheel P fits within the ring-gear M, which, as shown more particularly in Fig. 5, has a smooth inner circumference. A recess W is shown within the ring-gear M, within which is pivoted a pawl X, engaged by a spring Y. The pawl X is adapted to engage the teeth of the ratchet-wheel P, as more particularly shown in Figs. 3 and 4.

The operation of the jack is as follows: When it is desired to lift a weight with the jack, the shaft I is turned by the crank-arm K in the direction indicated by the arrow, Fig. 4. As the gear L rotates with the shaft I the ring-gear M, meshing with the gear L, will be rotated in the direction indicated by the arrow, Fig. 4. When rotated in this direction, the pawl X will pass over the teeth of the ratchet-wheel P, which may remain stationary. When, however, the worm H and shaft I are rotated in a reverse direction, the gear L will tend to turn the ring-gear M in the direction opposite to that indicated by the arrow, Fig. 4, whereupon the pawl X will be forced by the spring Y into engagement with the teeth of the ratchet-wheel P, so that the ratchet-wheel will necessarily rotate with the ring-gear M; but when the ratchet-wheel is rotated the plates Q, rigidly secured thereto, are likewise rotated against the friction of the plates S and U.

The friction device is connected to the operative parts of the jack at a point on the shaft I near the crank-arm where the power is applied by the operator, and consequently the retarding tendency of the friction device may be overcome more readily when the power is applied through the crank-arm by the operator than when it is applied through the lifting-screw, worm-wheel, and worm.

Having now described my invention, what I claim, and desire to secure by Letters Patent, is—

1. In a lifting-jack, the combination with a vertically-disposed lifting-screw; of a horizontally-disposed worm; a crank-shaft operating said worm; a worm-wheel for transmitting the rotary movement of said worm to said screw; a friction device for retarding the movement of said crank-shaft; and a gearing effecting the connection between said friction device and crank-shaft only when the crank-shaft is rotated in one direction, substantially as described.

2. In a lifting-jack, the combination with a vertically-disposed lifting-screw; of a horizontally-disposed crank-shaft carrying a worm; a worm-wheel for transmitting the rotary movement of said crank-shaft to said screw; a friction device; and a gearing constantly engaging said crank-shaft at a point between said worm and the place where the power is applied, and engaging said friction device when rotated in one direction, and released from engagement when rotated in the reverse direction, substantially as described.

3. In a lifting-jack, the combination with a vertically-disposed lifting-screw; of a horizontally-disposed crank-shaft carrying a worm; a worm-wheel for transmitting the rotary movement of said crank-shaft to said screw; a gearing constantly engaging said crank-shaft; a friction device; and a wheel constantly connected to said friction device and engaged by said gearing when rotated in one direction, and free from engagement when rotated in the reverse direction, substantially as described.

4. In a lifting-jack, the combination with a vertically-disposed lifting-screw; of a horizontally-disposed crank-shaft carrying a worm; a worm-wheel for transmitting the rotary movement of said crank-shaft to said screw; an idler-wheel carrying one or more friction-plates; and a gearing engaging said crank-shaft and operating said wheel when rotated in one direction, substantially as described.

5. In a lifting-jack, the combination with a vertically-disposed lifting-screw; of a horizontally-disposed crank-shank carrying a worm; a worm-wheel for transmitting the rotary movement of said crank-shaft to said screw; an idler-wheel carrying one or more friction-plates; and a ring-gear mounted on said wheel constantly engaging said crank-shaft and adapted to operate said wheel when rotated in one direction, substantially as described.

6. In a lifting-jack, the combination with a vertically-disposed lifting-screw; of a horizontally-disposed crank-shaft carrying a worm; a worm-wheel for transmitting the rotary movement of said crank-shaft to said screw; a wheel carrying one or more friction-plates; one or more adjustable friction-plates adapted to coact with said rotary plates; and a connection between said wheel and crank-shaft to rotate said wheel only when the crank-shaft is rotated in one direction, substantially as described.

7. In a lifting-jack, the combination with a vertically-disposed lifting-screw; of a horizontally-disposed crank-shaft carrying a worm; a worm-wheel for transmitting the rotary movement of said crank-shaft to said screw; a ratchet-wheel connected with a friction device; and a ring-gear mounted on said wheel constantly engaging said crank-shaft and carrying a pawl adapted to engage said ratchet-wheel when said gear is rotated in one direction, substantially as described.

In witness whereof I have hereunto set my hand on the 23d day of December, 1904.

ADOLF SCHATZ.

Witnesses:
  H. A. SCHATZ,
  C. S. BOUTON.